United States Patent [19]
Evans

[11] Patent Number: 5,070,968
[45] Date of Patent: Dec. 10, 1991

[54] LEADING/TRAILING DRUM BRAKE HAVING SERVO PARKING BRAKE

[75] Inventor: Anthony C. Evans, Northville, Mich.

[73] Assignee: Kelsey-Hayes Company, Romulus, Mich.

[21] Appl. No.: 408,857

[22] Filed: Sep. 18, 1989

[51] Int. Cl.⁵ ............................................. F16D 51/06
[52] U.S. Cl. .............................. 188/79.64; 188/106 A
[58] Field of Search ............... 188/79.54, 79.63, 79.64, 188/106 A, 106 F, 326, 79.55, 79.56, 196 BA, 196 V, 329, 331

[56] References Cited

U.S. PATENT DOCUMENTS

| | | | |
|---|---|---|---|
| 2,219,764 | 10/1940 | Chaminade | 188/106 A |
| 3,292,745 | 12/1966 | Dombeck | 188/106 A X |
| 3,709,334 | 1/1973 | Kondo et al. | 188/106 A X |
| 4,595,084 | 6/1986 | Le Deit | 188/106 A X |
| 4,678,067 | 7/1987 | Thompson | 188/106 F X |
| 4,768,631 | 9/1988 | Heibel | 188/106 A X |

*Primary Examiner*—Robert J. Oberleitner
*Assistant Examiner*—Peter M. Poon
*Attorney, Agent, or Firm*—MacMillan, Sobanski & Todd

[57] ABSTRACT

A drum brake assembly wherein the hydraulic service brake acts as a leading/trailing brake and the parking or emergency brake acts as a duo-servo brake. A lever member is pivotally mounted on one of a pair of brake shoes and operated by a brake actuating lever pivotally mounted on a composite link disposed adjacent a rotation-preventing stop and operatively connected to the other of the brake shoes. The lever member acts on another composite link disposed adjacent a hydraulic actuator of the service brake and operatively connected to the other of the brake shoes.

8 Claims, 6 Drawing Sheets

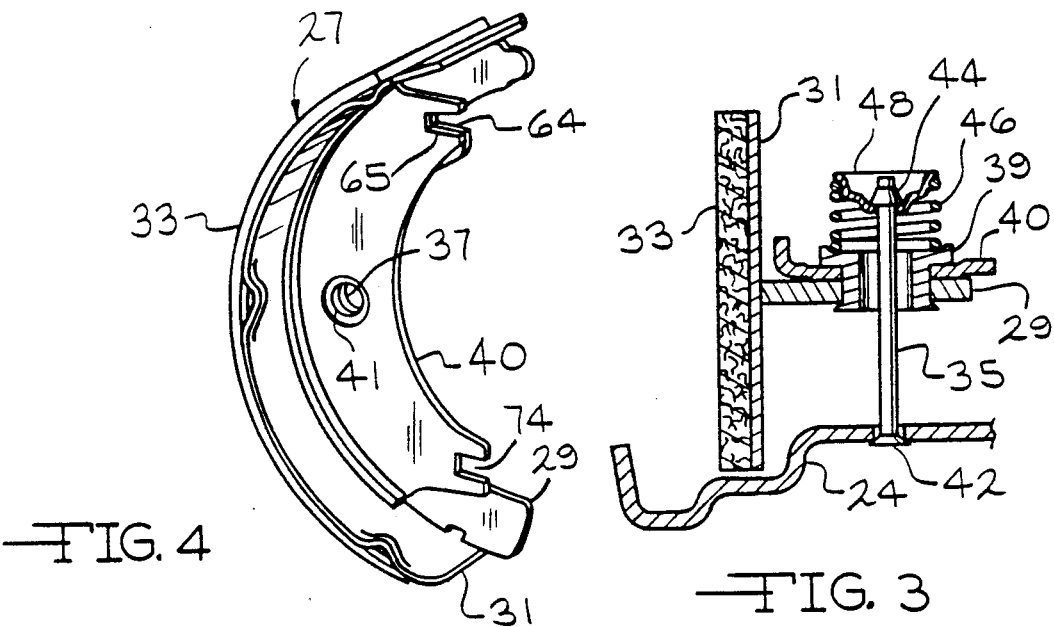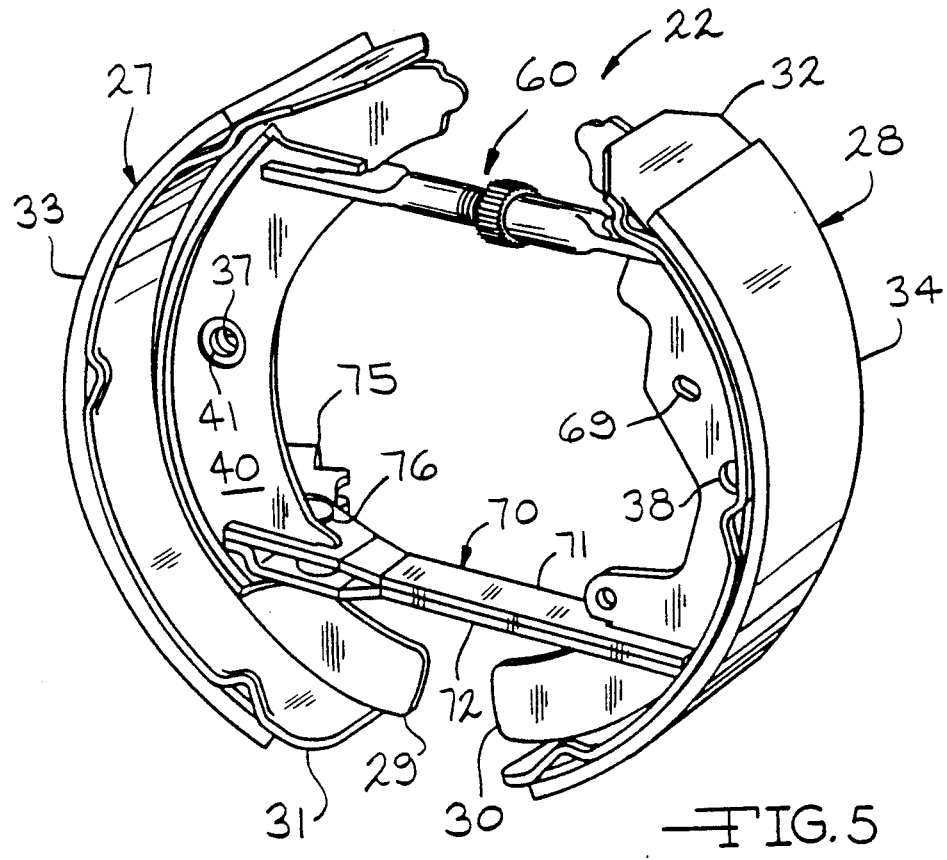

LEADING/TRAILING DRUM BRAKE HAVING SERVO PARKING BRAKE

BACKGROUND OF THE INVENTION

This invention relates to a drum brake assembly wherein the service brake acts as a leading/trailing brake and the parking or emergency brake acts as a duo-servo brake. Before my invention, it was not feasible to put leading/trailing service brakes on large vehicles, because the parking brake mechanisms associated with the leading/trailing service brake would not meet the necessary parking brake requirements.

SUMMARY OF THE INVENTION

In accordance with the invention, a leading/trailing drum brake assembly is provided wherein the service brake acts as a leading/trailing brake and the parking or emergency brake acts as a duo-servo brake. The duo-servo parking or emergency brake enables the leading/trailing service brake to be installed on large vehicles while meeting the necessary parking brake requirements.

BRIEF DESCRIPTION OF THE DRAWINGS

FIG. 3 is a sectional view taken along line 3—3 of FIG. 1;

FIG. 4 is an pictorial view of the left-hand brake shoe of FIGS. 1 and 2 with a lever member pivotally mounted upon the web thereof in accordance with my invention;

FIG. 5 is a pictorial view of various parts of the drum brake assembly of FIGS. 1 and 2;

DETAILED DESCRIPTION OF THE PREFERRED EMBODIMENT

Figure 1:
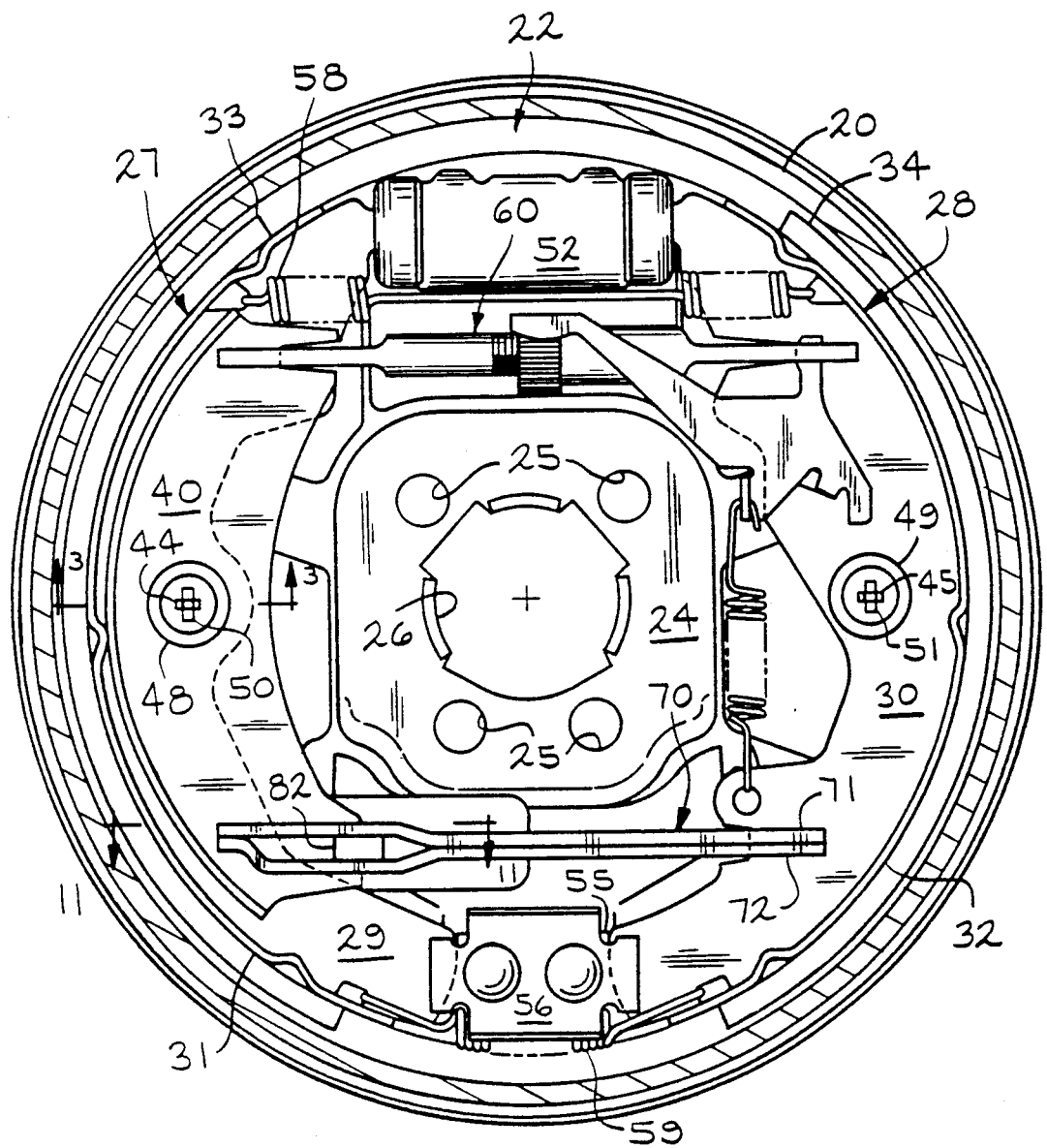
FIG. 1 is an outboard elevational view of a drum brake assembly constructed in accordance with my invention.
Figure 2:
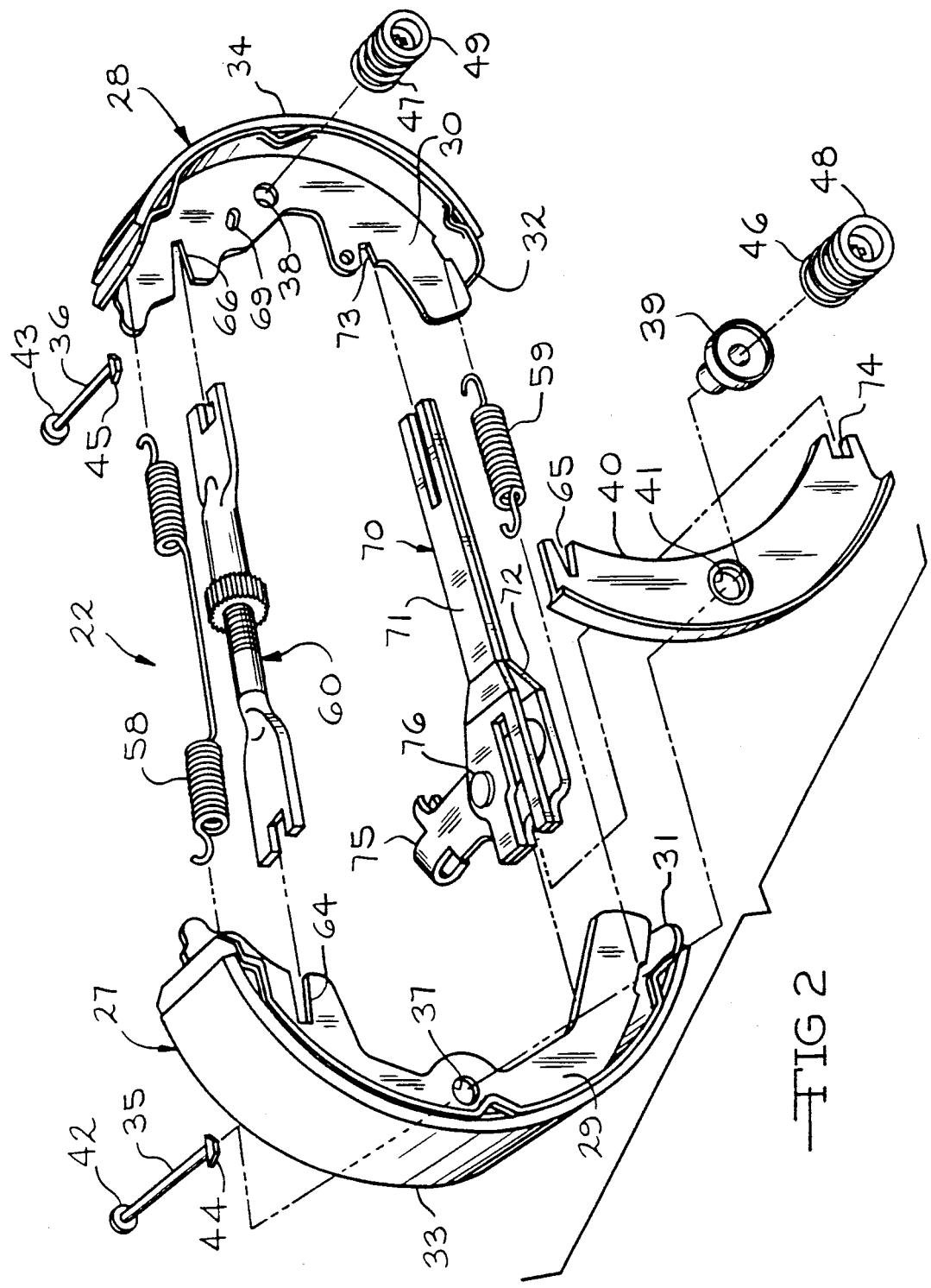
FIG. 2 is an exploded pictorial view of various parts of the drum brake assembly of FIG. 1.
Figure 6:
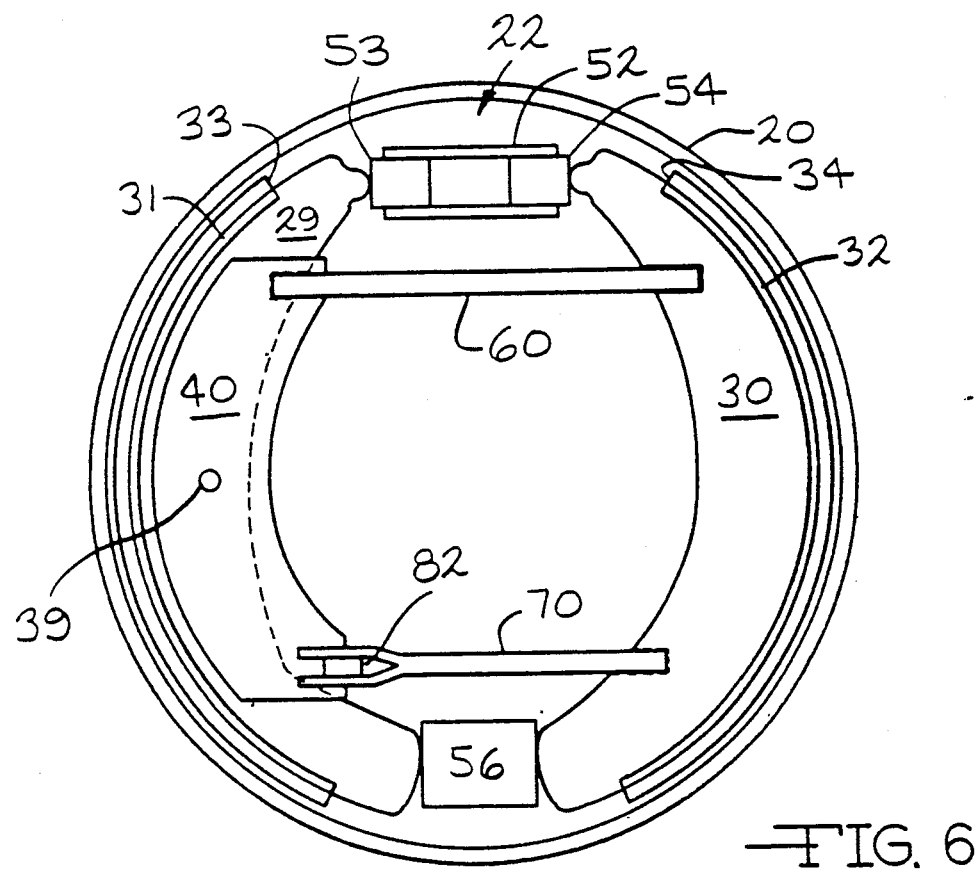
FIGS. 6-10 are schematic views of various parts of the drum brake assembly of FIG. 1, showing different positions thereof under various operating conditions.

With reference to the drawings, FIG. 1 represents an outboard vertical sectional view through a typical leading/trailing drum brake assembly for the right rear wheel of an automotive vehicle constructed in accordance with my invention. A backing plate 24 for the brake assembly 22 typically has four holes 25, for mounting the plate on the vehicle frame (not shown) by four bolts (not shown), and a hole 26 for receiving a typical axle or spring (not shown).

With reference to FIGS. 1-5, brake assembly 22 includes a first brake shoe 27 and an oppositely c· ·osed second brake shoe 28 respectively having arcuate webs 29 and 30 with tables 31 and 32 having affixed thereto arcuate friction pads 33 and 34. Brake shoes 27 and 28 are typically affixed to the backing plate 24 respectively by a pair of pins 35 and 36 (FIG. 2) extending through holes 37 and 38 in webs 29 and 30. Pin 35 also extends through a hollow rivet or hinge pin 39 by which lever 40 of the parking brake mechanism is pivotally connected to web 29. The rivet 39 extends through a hole 41 in the lever 40 and through the hole 37.

The pins 35 and 36 respectively have enlarged heads 42 and 43 retained on the inboard side of the backing plate 24 and flattened, wedge-shaped ends 44 and 45. The pins 35 and 36 also pass through compression springs 46 and 47 and through flanged-cup retainers 48 and 49. The retainer cups are provided with a pair of slots 50 and 51 through which the flattened ends 44 and 45 are passed and then turned ninety degrees while the springs 46 and 47 are compressed, thereby securing the brake shoe assemblies 27 and 28 to backing plate 24.

A hydraulic actuator 52 (FIG. 1) is provided on backing plate 24 between the upper ends of brake shoe webs 29 and 30. Actuator 52 typically includes a pair of pistons 53 and 54 (shown schematically in FIGS. 6-10) outwardly movable from opposite ends of the actuator upon increase in pressure of hydraulic fluid thereby forcing the brake shoe assemblies into frictional engagement with brake drum 20.

Typically an abutment block 56 positioned between brake shoe webs 40 and 30 acting in concert with the hydraulic actuator 52 to transfer all braking torque to the vehicle frame.

A brake shoe retracting spring 58 adjacent the actuator 52 typically engages brake webs 29 and 30 and biasing the upper end portions of the webs 29 and 30 against pistons 53 and 54 respectively. Similarly, a brake shoe retracting spring 59 adjacent the block 56 engages webs 29 and 30 in engagement with the block 56.

Below tension spring 58, a typical composite expansible strut 60, shown schematically in FIGS. 6-10 as a one-piece member, is operatively associated at one end with web 29 and lever 40 and at the opposite end with web 30. The composite strut 60 serves as part of the duo-servo parking brake mechanism and also as part of a typical automatic brake adjusting mechanism more fully explained in U.S. Pat. No. 4,401,195, which is hereby incorporated by reference issued to Larry L. Last on Aug. 30, 1983. A bifurcated end of strut 60 is operatively associated with web 29 at notch 64 therein and with the lever 40 at notch 65 therein, and web 30 at notch 66 therein.

The duo-servo parking or emergency brake mechanism includes a composite link 70, shown schematically in FIGS. 6-10 as a one-piece member, but including an upper part 71 and a lower part 72 welded together. A bifurcated end of composite link 70 operatively engages web 30 at notch 73 therein and an opposite bifurcated end of link 70 operatively engages a lower portion of web 29 and with the lever 40 at notch 74 therein (see FIG. 2). At the end of composite link 70 adjacent web 29 and lever 40, the elements 71 and 72 are offset from each other to provide a space for the brake actuating lever 75 pivotally mounted therein on a pin 76. As shown in FIG. 11, a brake operating cable 77 having a stop 78 on the end thereof engages end 79 of actuating lever 75. Lever return spring 80 is provided on the cable between lever 75 and a portion 81 of backing plate 24, thereby biasing lever 75 to the inoperative position. An end 82 of the lever 75 operatively engages lever 40.

With reference to FIGS. 6-10, FIG. 6 shows the relative positions of the various parts of drum brake assembly 22 with neither the hydraulic service brake nor the mechanical parking brake applied.

Figure 7:
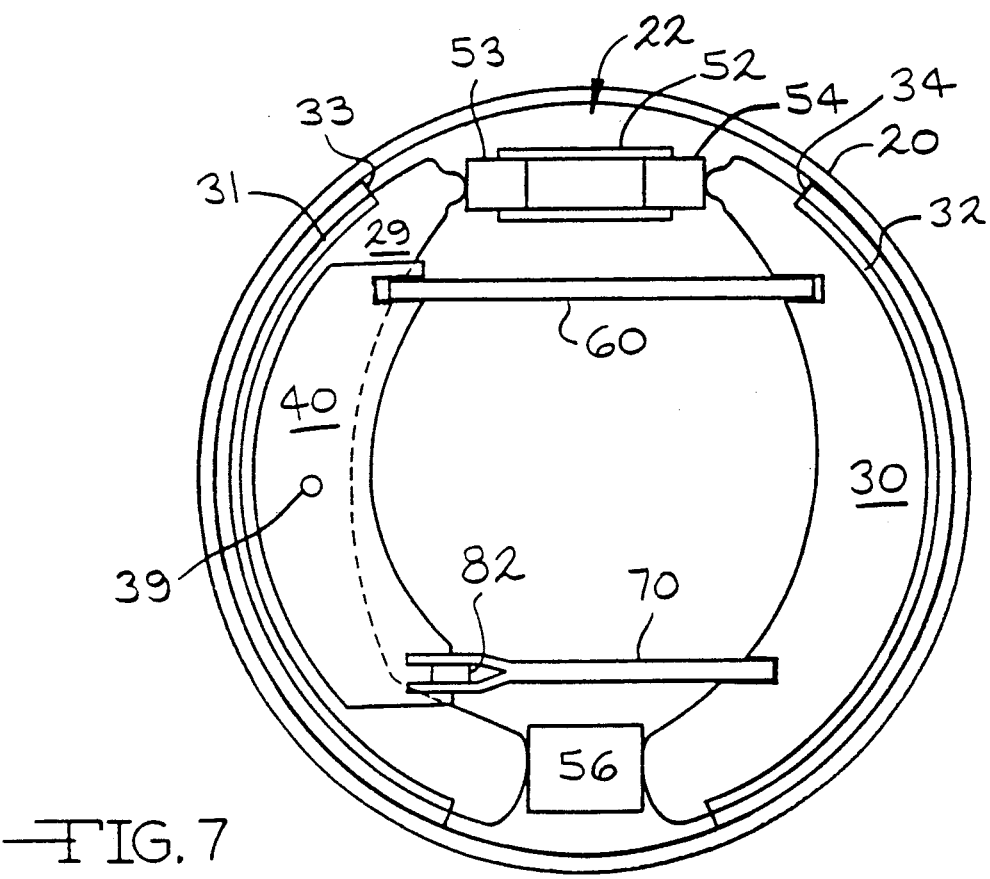

FIG. 7 shows the relative positions with the hydraulic service brake applied. The pistons 53 and 54 are extended outward from their normal retracted positions in actuator 52, and friction pads 33 and 34 are in braking engagement with brake drum 20. Both, webs 29 and 30 are in abutting engagement with the stop 55 and a leading/trailing brake action is apparent.

Figure 8:
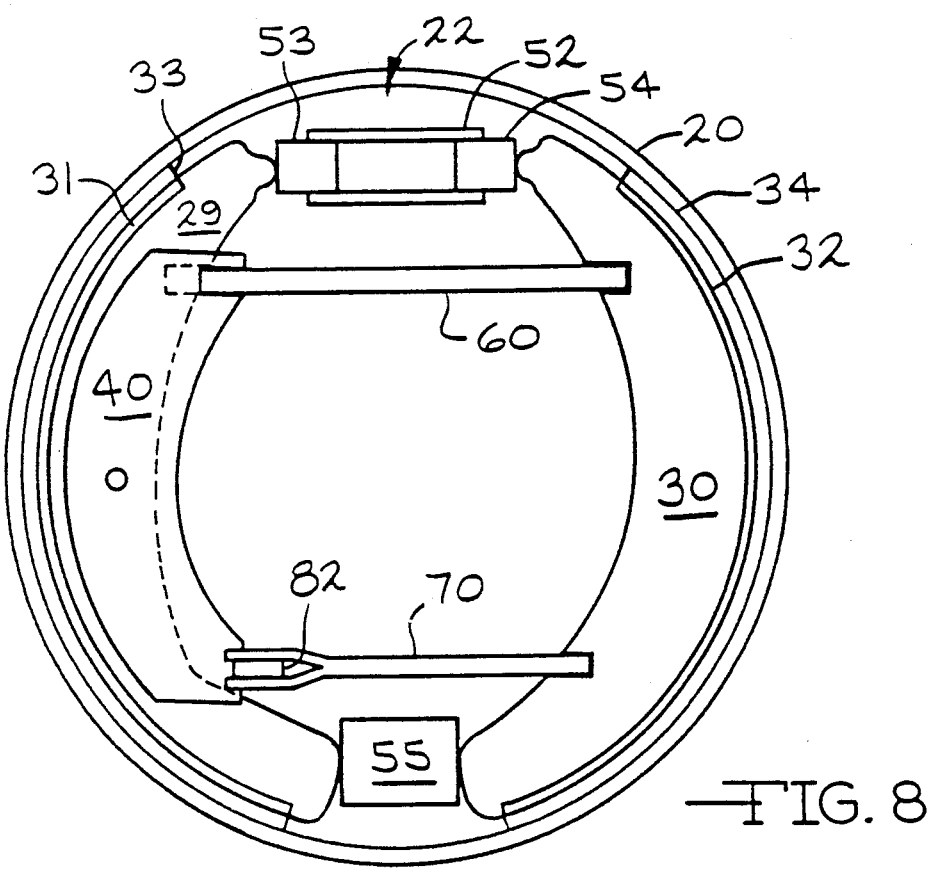

In FIG. 8, the mechanical parking brake is shown as being applied while the hydraulic service brake is activated. Pistons 53 and 54 are in their extended positions and the end 82 of the lever 75 has moved against lever 40 thereby pivoting lever 40 clockwise into solid engagement with the adjusting strut 60 from its position in FIG. 7 and thereby moving strut 60 into solid engagement with web 30. Further movement of the lever end 82 thus translates lever 40 toward the left and also moves the lower end of the web 29 toward the left by means of the pivotal connection between the web 29 and lever 40 at the hollow rivet 39. With the friction pad 33 in full frictional engagement with brake drum 20, further pivoting of lever 75 causes the pin to move the composite link 70 and the lower end of web 30 to the right, fully engaging friction pad 34 with brake drum 20.

Figure 9:
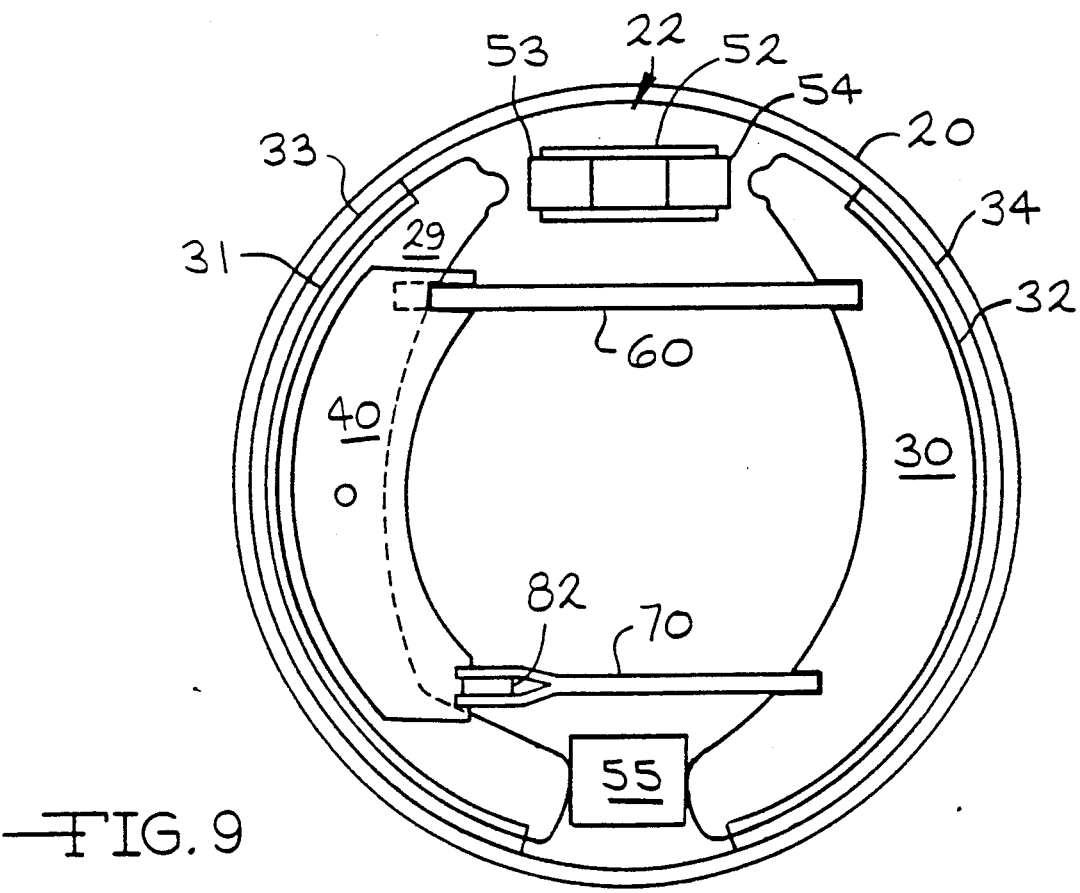

In FIG. 9, the hydraulic service brake is shown as having been released while the mechanical parking brake remains applied. Thus pistons 53 and 54 have retracted into actuator 52, however the rest of the parts are in the same activated positions as shown in FIG. 8.

Figure 10:
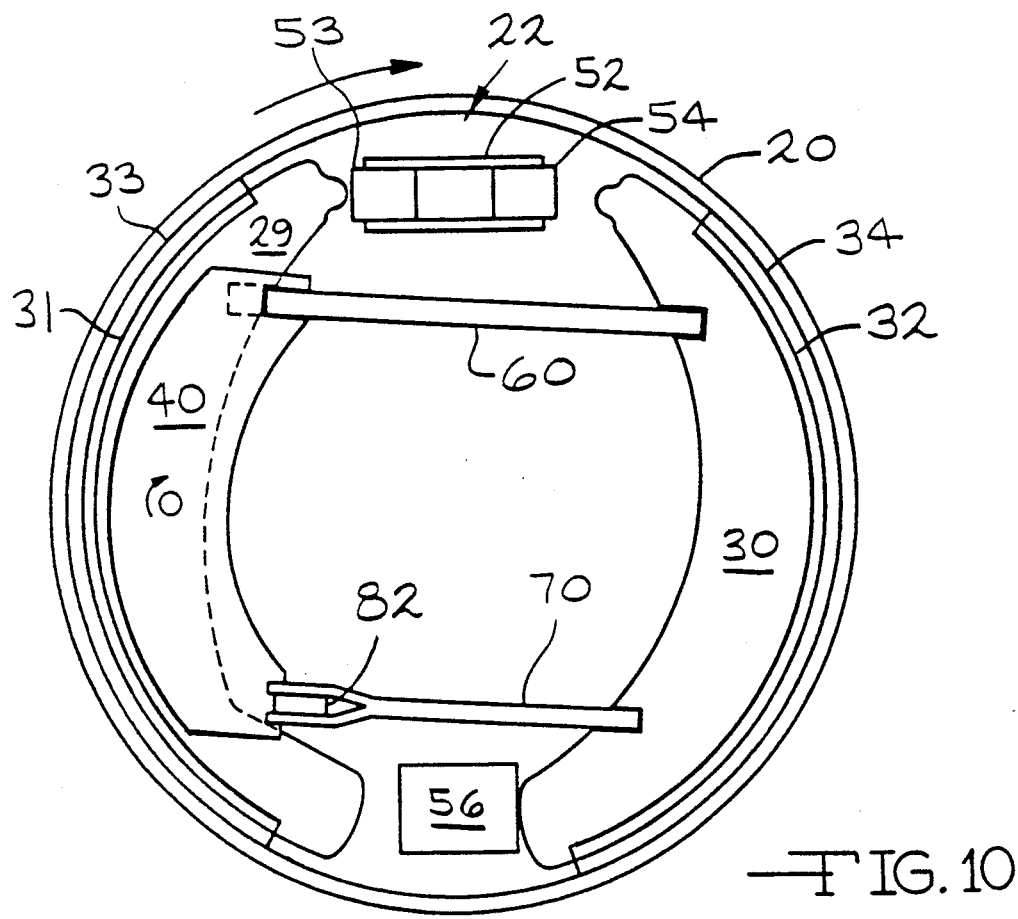
Figure 11:
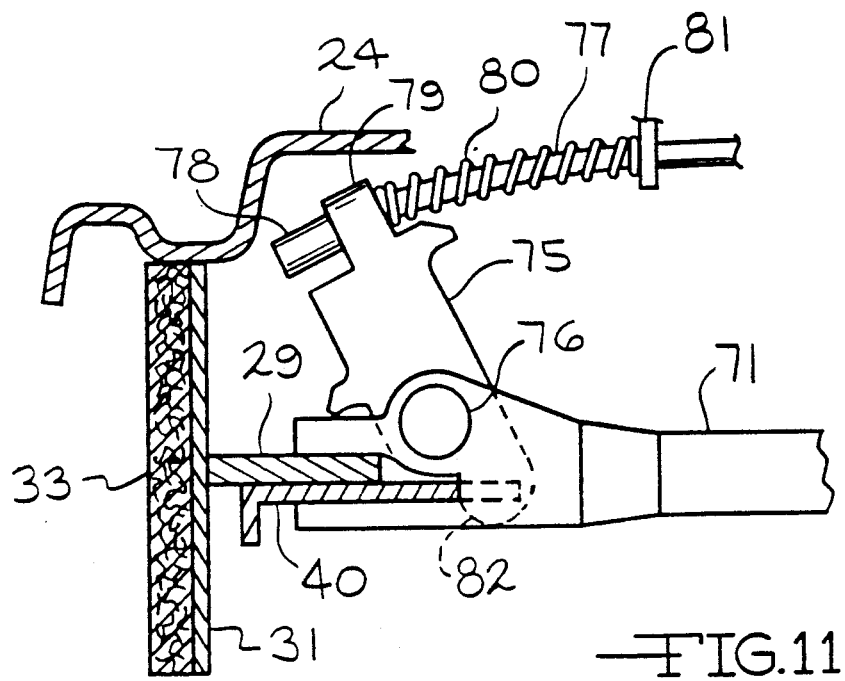
FIG. 11 is a view, partially in section, taken along line 11—11 of FIG. 1.

FIG. 10 illustrates action of the mechanical parking brake when the vehicle tends to move toward the right thereby tending to rotate brake drum 20 clockwise. Upon clockwise rotation of drum 20 brake shoe assembly 27 is dragged along with drum 20 because of its frictional engagement therewith thereby imposing an axial force upon adjusting strut 60 forcing brake shoe assembly 28 into further frictional engagement with drum 20 thusly affecting a duo-servo mechanical parking brake action.

It will be seen that I have provided a drum brake assembly 22 having a leading/trailing hydraulic service brake and a mechanical duo-servo parking brake.

Various modifications may be made in the structure shown and described without departing from the spirit and scope of the invention.

I claim:

1. A drum brake assembly having a leading/trailing service brake and a duo-servo parking brake, said assembly comprising a pair of opposed arcuate brake shoes, a hydraulic actuator disposed between and engageable with a first pair of adjacent ends of said brake shoes, a rotation-preventing stop disposed between a second pair of adjacent ends of said brake shoes opposite said first pair, only a single lever member pivotally mounted on a first one of said brake shoes, a first composite link disposed adjacent said hydraulic actuator and engageable at one end with said lever and engageable at an opposite end with a second one of said brake shoes, and a second composite link disposed adjacent said stop, having a parking brake actuating lever pivotally mounted thereon adjacent to one end, and being engageable at an opposite end with said second one of said brake shoes, said parking brake actuating lever being engageable with said lever member.

2. The drum brake assembly defined in claim 1 wherein said lever member has an arcuate shape generally corresponding to the arcuate shape of said brake shoes.

3. The drum brake assembly defined in claim 1 and further including a backing plate, and means for pivotally supporting one of said brake shoes and said lever relative to said backing plate about a common pivot axis.

4. The drum brake assembly defined in claim 3 wherein each of said brake shoes includes an arcuate shaped web for supporting an arcuate friction pad, and a hold-down pin attached to and extending outwardly from said backing plate through a hole in said web of one of said brake shoes and a hole in said lever member for pivotally supporting said one brake shoe and said one lever member, and means for retaining said one brake shoe and said lever member on said pin.

5. In a drum brake assembly having a pair of opposed arcuate brake shoes, a hydraulic actuator disposed between and engageable with a first pair of adjacent ends of said brake shoes, a rotation preventing stop disposed between a second pair of adjacent ends of said brake shoes opposite said first pair, a first composite link disposed adjacent said hydraulic actuator and engageable at a second end with a second one of said brake shoes, and a second composite link disposed adjacent said stop, having a parking brake actuating lever pivotally mounted thereon adjacent one end, and being engageable at an opposite end with said second one of said brake shoes, the improvement comprising only a single lever member pivotally mounted on a first one of said brake shoes, said first composite link being engageable at a first end with said lever member, and said parking brake actuating lever being engageable with said lever member.

6. The drum brake assembly defined in claim 5 wherein said lever member has an arcuate shape generally corresponding to the arcuate shape of said brake shoes.

7. The drum brake assembly defined in claim 5 and further including a backing plate, and means for pivotally supporting one of said brake shoes and said lever relative to said backing plate about a common pivot axis.

8. The drum brake assembly defined in claim 7 wherein each of said brake shoes includes an arcuate shaped web for supporting an arcuate friction pad, and a hold-down pin attached to and extending outwardly from said backing plate through a hole in said web of one of said brake shoes and a hole in said lever member for pivotally supporting said one brake shoe and said one lever member, and means for retaining said one brake shoe and said lever member on said pin.

* * * * *